(12) United States Patent
Tione et al.

(10) Patent No.: US 11,981,301 B2
(45) Date of Patent: May 14, 2024

(54) ELECTRO-PNEUMATIC EMERGENCY AND SERVICE BRAKING CONTROL SYSTEM, FOR AT LEAST ONE RAILWAY VEHICLE

(71) Applicant: FAIVELEY TRANSPORT ITALIA S.P.A., Turin (IT)

(72) Inventors: Roberto Tione, Turin (IT); Angelo Grasso, Asti (IT)

(73) Assignee: FAIVELEY TRANSPORT ITALIA S.P.A., Turin (IT)

( * ) Notice: Subject to any disclaimer, the term of this patent is extended or adjusted under 35 U.S.C. 154(b) by 320 days.

(21) Appl. No.: 17/597,762

(22) PCT Filed: Jul. 22, 2020

(86) PCT No.: PCT/IB2020/056887
§ 371 (c)(1),
(2) Date: Jan. 21, 2022

(87) PCT Pub. No.: WO2021/014374
PCT Pub. Date: Jan. 28, 2021

(65) Prior Publication Data
US 2022/0258709 A1    Aug. 18, 2022

(30) Foreign Application Priority Data
Jul. 22, 2019   (IT) .................. 102019000012480

(51) Int. Cl.
B60T 8/18        (2006.01)
B60T 8/94        (2006.01)
(Continued)

(52) U.S. Cl.
CPC .............. B60T 8/94 (2013.01); B60T 17/228 (2013.01); *B60T 2270/402* (2013.01); *B60T 2270/406* (2013.01)

(58) Field of Classification Search
CPC ..... B60T 8/18; B60T 8/17; B60T 8/26; B60T 8/32; B60T 8/88; B60T 8/92; B60T 8/172
See application file for complete search history.

(56) References Cited

U.S. PATENT DOCUMENTS

| | | | |
|---|---|---|---|
| 5,934,765 A * | 8/1999 | Hart ...................... | B60T 8/1893 303/9.69 |
| 2020/0130668 A1 * | 4/2020 | Tione .................... | B60T 15/021 |
| 2021/0162972 A1 * | 6/2021 | Schnittger ............... | B60T 15/02 |

FOREIGN PATENT DOCUMENTS

| WO | 2013144543 A2 | 10/2013 |
|---|---|---|
| WO | 2015181764 A1 | 12/2015 |
| WO | 2019123198 A1 | 6/2019 |

OTHER PUBLICATIONS

ISA European Patent Office, International Search Report Issued in Application No. PCT/IB2020/056887, dated Sep. 1, 2020, WIPO, 4 pages.

(Continued)

*Primary Examiner* — Tan Q Nguyen
(74) *Attorney, Agent, or Firm* — McCoy Russell LLP

(57) ABSTRACT

An electro-pneumatic service and emergency braking control system is described, comprising:
a switching device arranged to allow the connection of a first group of control and feedback signals from an emergency braking control module to an electro-pneumatic emergency braking module when a monitoring device determines the correct operation of the emergency braking control module and to allow the connection of a third group of control and feedback signals from the service braking control module to the electro-pneumatic emergency braking module when the monitoring device determines the incorrect operation of the emergency braking control module.

6 Claims, 4 Drawing Sheets

(51) Int. Cl.
*B60T 17/22* (2006.01)
*B60T 8/88* (2006.01)

(56) References Cited

OTHER PUBLICATIONS

ISA European Patent Office, Written Opinion of the International Searching Authority Issued in Application No. PCT/IB2020/056887, dated Sep. 1, 2020, WIPO, 6 pages.

* cited by examiner

ELECTRO-PNEUMATIC EMERGENCY AND SERVICE BRAKING CONTROL SYSTEM, FOR AT LEAST ONE RAILWAY VEHICLE

CROSS REFERENCE TO RELATED APPLICATIONS

The present application is a U.S. National Phase of International Application No. PCT/IB2020/056887 entitled "ELECTRO-PNEUMATIC EMERGENCY AND SERVICE BRAKING CONTROL SYSTEM, FOR AT LEAST ONE RAILWAY VEHICLE," and filed on Jul. 22, 2020. International Application No. PCT/IB2020/056887 claims priority to Italian Patent Application No. 102019000012480 filed on Jul. 22, 2019. The entire contents of each of the above-listed applications are hereby incorporated by reference for all purposes.

TECHNICAL FIELD

The present invention is generally in the sector of railway braking systems; in particular, the invention relates to an electro-pneumatic emergency and service braking control system for a railway vehicle.

PRIOR ART

The most recent railway braking systems use advanced electronic solutions in order to simplify the pneumatic architecture, especially the pneumatic portion used for emergency braking, with a consequent overall reduction of total product costs, reduction in weight, increase in performance and increase in operational safety.

FIG. 1 illustrates a typical architecture of a new generation electro-pneumatic system 100.

An electro-pneumatic emergency braking module 101 is powered by a pneumatic supply pressure 102.

The electro-pneumatic emergency braking module 101 is controlled, through closed-chain control algorithms, by an emergency braking control module 103 by means of control and feedback signals 105, this emergency braking control module 103 being an electronic control unit.

The emergency braking control module 103 receives at its input one or more weight signals 104 indicating the weight value that must be braked by the electro-pneumatic system 100. Said one or more weight signals 104 may be generated by pressure transducers suitable to measure the pressure generated by the suspension systems of the railway vehicle. Alternatively, said one or more weight signals 104 may be generated by linear or angular position transducers suitable to measure the distance of a bogie from the body of the railway vehicle. This distance varies according to the weight of the body.

The emergency braking control module 103 controls the electro-pneumatic emergency braking module 101 to generate an emergency braking pressure 106.

This emergency braking pressure 106 is a function of design parameters of the railway vehicle, such as, for example, but not exclusively, the maximum adhesion value envisaged between the wheel and the rail, and the weight value to be braked derived from the weight signals 104. Further values may affect the calculation of the emergency pressure 106 such as, but not exclusively, the instantaneous speed value of the vehicle 130, and/or a pressure value 131 indicating an emergency pressure request value, and/or an efficiency value 132 of the electrodynamic braking provided by the traction systems.

Said emergency braking pressure 106 powers an electro-pneumatic service braking module 107, allowing said electro-pneumatic service braking module to in turn generate one or more service braking pressures 111, . . . , 114.

In embodiments known to those skilled in the art, the emergency braking pressure 106 is supplied to the electro-pneumatic service braking module 107 simultaneously with the supply pressure 102.

In both cases just described, the current value of the emergency braking pressure 106 represents at all times the maximum current value that may be reached by the service braking pressures 111, . . . , 114.

Real examples of both of the aforesaid cases will be provided hereinafter.

The electro-pneumatic service braking module 107 is controlled, via closed-chain control algorithms, by a service braking control module 108 by means of control and feedback signals 109, said service braking control module 108 also being an electronic control unit.

The service braking control module 108 receives an input signal 110 indicating a service braking request, in the form of a pressure value request, or a braking force request, or a deceleration request. Furthermore, the service braking control module 108 receives at its input one or more weight signals 104 indicating the weight value that must be braked by the electro-pneumatic system 100.

The service braking control module 108 controls the electro-pneumatic service braking module 107 to generate one or more service braking pressures 111, . . . , 114.

Such one or more service braking pressures 111, . . . , 114 are a function of at least the service braking request 110 and the weight value to be braked derived from the weight signals 104. The one or more service braking pressures 111, . . . , 114 are arranged to brake one or more axles of the railway vehicle. Further values may affect the calculation of one or more service braking pressures 111, . . . , 114 such as, but not exclusively, the instantaneous speed value of the vehicle 130, and/or an efficiency value 132 of the electrodynamic braking provided by the traction systems.

The electro-pneumatic service braking module 107 is designed to generate a maximum pneumatic service pressure value 111, . . . , 114 corresponding to the current value of the emergency pressure 106.

Furthermore, the electro-pneumatic service braking module 107 is designed in such a way that, in the absence of control and feedback signals 109 between the electro-pneumatic service braking module 107 and the service braking control module 108, it transfers the current emergency braking pressure value 106 to its service outputs 111, . . . , 114.

An emergency braking request signal 115 acts on an interruption device 116. This interruption device 116 may be, for example, but not exclusively, a multi-switching relay, or a multiplicity of semiconductor switches. The interruption device 116 is designed in such a way as to maintain a closed contact configuration in the absence of an emergency braking request from the emergency braking request signal 115 and to maintain an open contact configuration in the presence of an emergency braking request from the emergency braking request signal 115.

In this way, in the absence of an emergency braking request from the signal 115, the electropneumatic service braking module 107 generates one or more service braking pressures 111, . . . , 114 under control of the service braking control module 108.

These service braking pressures 111, . . . , 114 are upwardly limited to the current value of the emergency braking pressure 106. In the presence of an emergency braking request from the emergency braking request signal 115, the electro-pneumatic service module 107 propagates the value of the emergency braking pressure 106 to the service braking pressures 111, . . . , 114.

A first example of an electro-pneumatic system 100 is claimed in patent EP3148853, shown in FIG. 3.

In said FIG. 3, the EPDA module corresponds to the electro-pneumatic emergency braking module 101, the weighing control module corresponds to the emergency braking control module 103, the EPCA modules each correspond to the electro-pneumatic service braking module 107, the outputs of the EPCA modules toward brake cylinders BC1, . . . , BCN each correspond to a service braking pressure 111, . . . , 114, the braking control units each correspond to the service braking control module 108, the output pressure to the relay valve 4 corresponds to the emergency braking pressure 106, and the MBP pressure corresponds to the supply pressure 102.

The outlet pressure to the relay valve 4 supplies power to an electro-valve group made up of solenoid valves 10, 12, 20 used to pilot a relay valve RV.

With respect to this architecture, it is evident to one skilled in the art how the pressure value at the brake cylinders BC1, . . . , BCn may never exceed the pressure value present at the output of the relay valve 4 of FIG. 3, corresponding to the emergency braking pressure of the system 100 of FIG. 1.

A second example of an electro-pneumatic system 100 is claimed in patent EP2830918, shown in FIG. 4.

The dashed box 401 corresponds to the electro-pneumatic emergency braking module 101, the dashed box 402 corresponds to an electro-pneumatic service braking module 111, . . . , 114, the pneumatic signal 403 corresponds to the emergency braking pressure 106.

The braking systems as previously described are developed in accordance with railway standards EN50126, EN50128, EN50129.

EN50126 "Railway applications. The specification and demonstration of reliability, availability, maintainability and safety (RAMS). Basic requirements and generic process"

EN50128 "Railway applications—Communications, signaling and processing systems—Software for railway control and protection systems"

EN50129 "Railway applications. Communication, signalling and processing systems. Safety related electronic systems for signalling"

In particular, the EN50126 standard defines the methodology for assigning SIL0/1/2/3/4 safety levels to the subsystems, based on the results of the Safety Analysis, while the EN50128 and EN50129 standards define the design criteria to be applied to the software and hardware components respectively according to the assigned SIL levels. Based on the application of the standards cited above, the following statements and concepts may be expressed:

Electronic systems used to perform the service braking function may generally be constructed in accordance with the requirements dictated by the aforesaid standards, limiting said performance to safety levels not higher than SIL2.

Electronic systems used to perform the emergency braking function may be constructed in accordance with the requirements dictated by the aforesaid standards, restricting said performance to safety levels not lower than SIL3.

It is therefore known that the emergency braking control module 103, being used to control the generation of the emergency braking pressure 106, must be developed according to an SIL safety level higher than the SIL safety level required for the development of the service braking control module 108. Generally the emergency braking control module 103 is developed according to EN50128 and EN50129 SIL≥3, while the service braking control module 108 is developed according to EN50128 and EN50129 SIL≤2. A development according to EN50129 SIL≥3 requires said emergency braking control module 103 to be isolated and independent from said service braking control module 108.

A drawback of the system described above is represented in that in the presence of a failure of the emergency braking control module 103, the emergency braking pressure 106 may assume a value lower than the actual value necessary for emergency braking and service braking requested after the failure of the emergency braking control module 103. In this case, the electro-pneumatic system 100 will no longer be able to provide the braking force currently requested.

WO2019123198 describes a further braking control system for at least one railway vehicle.

SUMMARY OF THE INVENTION

An object of the present invention is to provide an electro-pneumatic service braking control system, particularly for at least one railway vehicle, which even in the presence of a failure of an emergency braking control module is capable of providing the braking force currently requested.

The aforesaid and other objects and advantages are achieved, according to an aspect of the invention, by an electro-pneumatic service and emergency braking control system, for at least one railway vehicle or one railway bogie, having the features defined in Claim 1. Preferred embodiments of the invention are defined in the dependent claims, the content of which is to be understood as an integral part of the present description.

BRIEF DESCRIPTION OF THE DRAWINGS

The functional and structural features of some preferred embodiments of an emergency and service braking control system according to the invention will now be described. Reference is made to the accompanying drawings, wherein.

DETAILED DESCRIPTION

Figure 1:
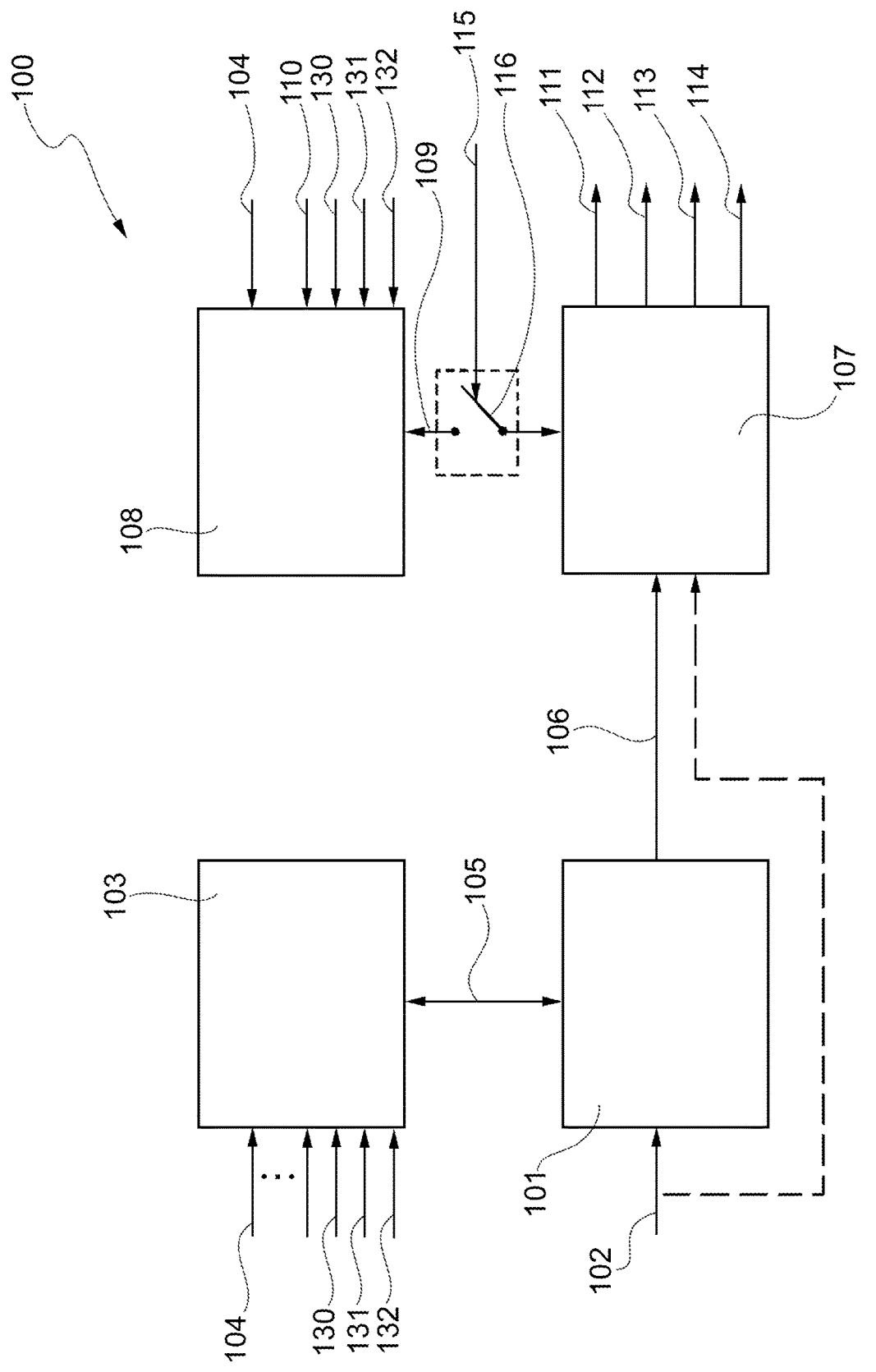
FIG. 1 illustrates an electro-pneumatic braking system made according to the prior art.

Before explaining in detail a plurality of embodiments of the invention, it should be clarified that the invention is not limited in its application to the construction details and configuration of the components presented in the following description or illustrated in the drawings. The invention may assume other embodiments and be implemented or constructed in practice in different ways. It should also be understood that the phraseology and terminology have a descriptive purpose and should not be understood as limiting. The use of "include" and "comprise" and their variations are to be understood as encompassing the elements set out below and their equivalents, as well as additional elements and the equivalents thereof.

Figure 2:
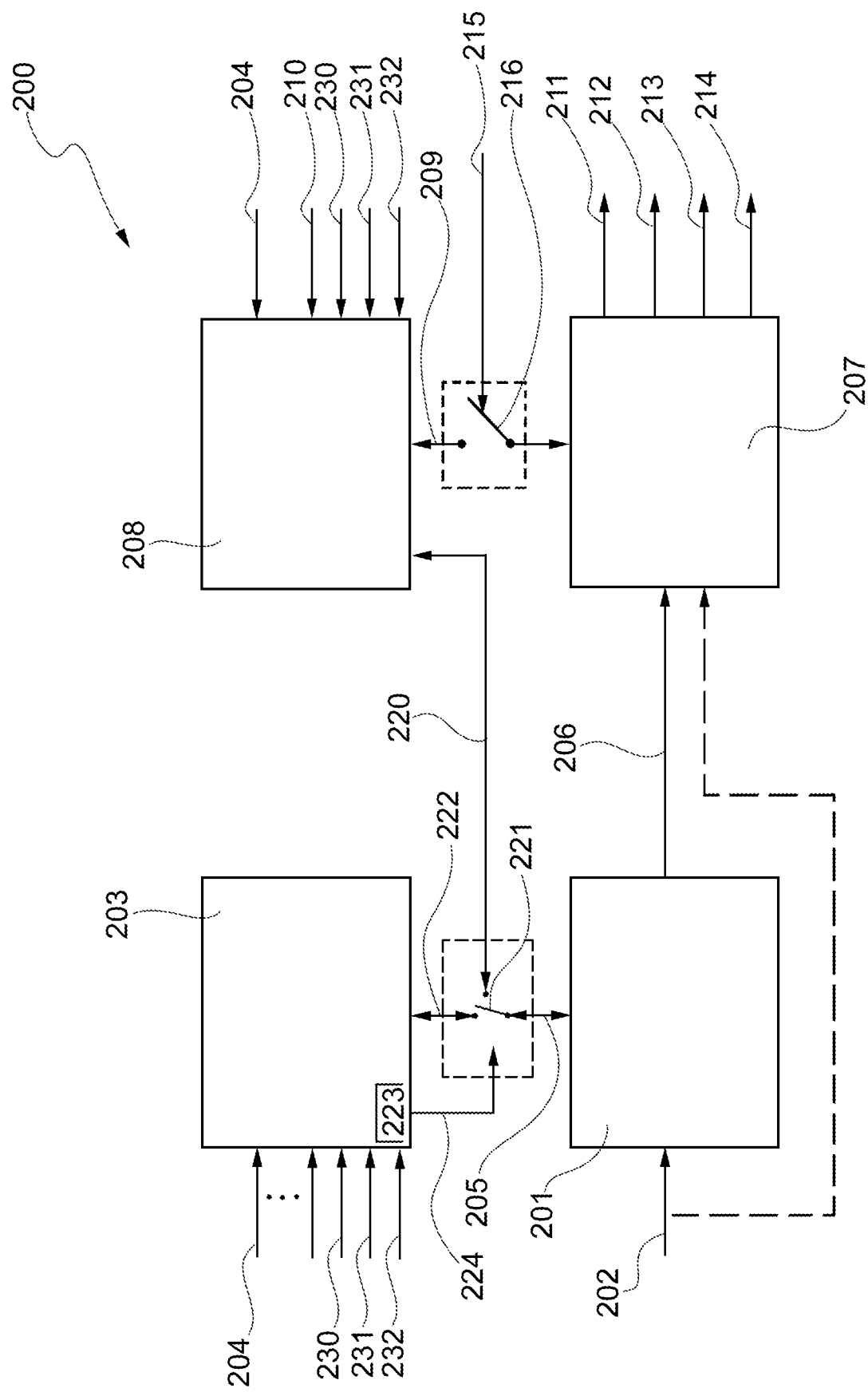
FIG. 2 illustrates an embodiment of an electro-pneumatic service braking control system, particularly for at least one railway vehicle, according to the invention.
Figure 3:
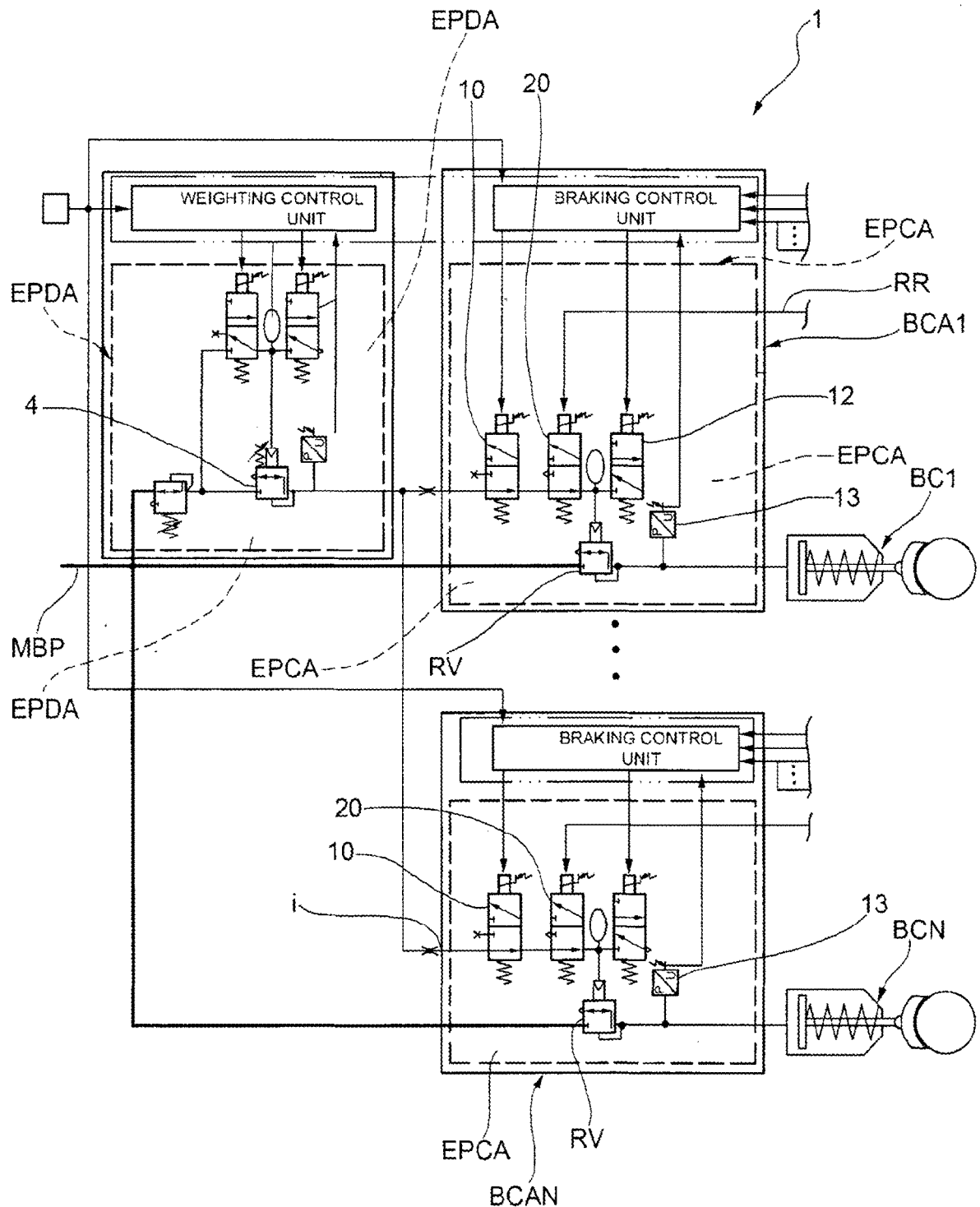
FIG. 3 illustrates an example embodiment of an electro-pneumatic braking system constructed according to the prior art.
Figure 4:
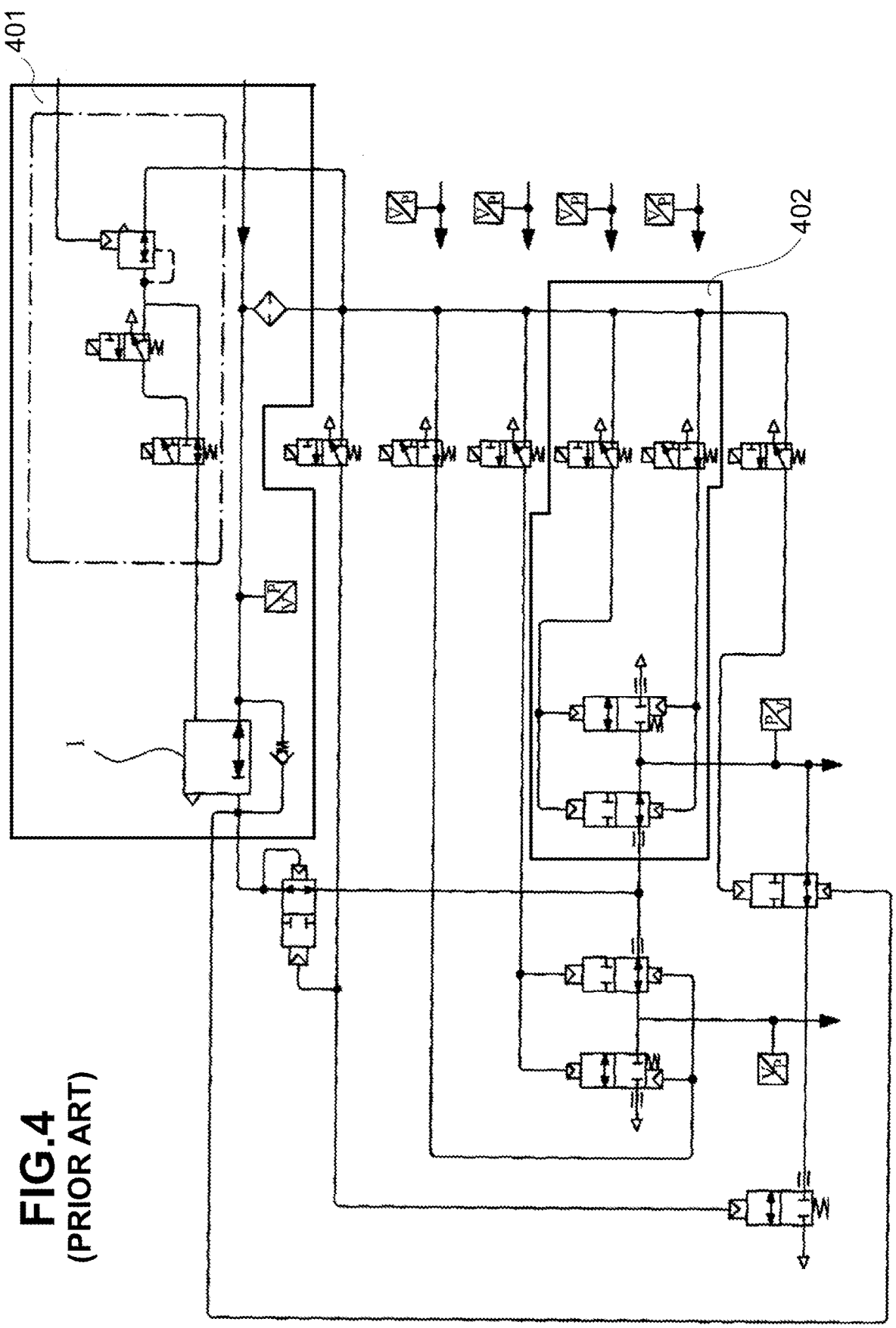
FIG. 4 illustrates a further embodiment of an electro-pneumatic braking system constructed according to the prior art.

Referring to FIG. 2, an electro-pneumatic service and emergency braking control system 200 is illustrated, for at least one railway vehicle or one railway bogie, according to the invention.

This electro-pneumatic service and emergency braking control system 200 comprises an electro-pneumatic emergency braking module 201 powered by a supply pressure 202 and arranged to generate an emergency braking pressure 206 and a emergency braking control module 203 arranged to control the electro-pneumatic emergency braking module 201 by means of a first group of control and feedback signals 222, so as to generate the emergency braking pressure 206 according to at least one weight information 204 relating to the at least one railway vehicle or railway bogie to be braked. Further values may condition the calculation of the emergency pressure 206 such as, but not exclusively, the instantaneous speed value of the vehicle 230, and/or a pressure value 231 indicating an emergency pressure request value, and/or an electrodynamic braking efficiency value 232 provided by the traction systems.

"Group of control and feedback signals" may mean the case wherein there is a control signal and a feedback signal, or the case wherein there are more control signals and/or more feedback signals, or even the case wherein there is also only a single signal that performs both the control and feedback functions. Usually, at least one control signal may be present, normally two, one to excite a charging valve and one to excite a discharging valve, and at least one feedback signal, that is a signal from a feedback sensor.

The electro-pneumatic service and emergency braking control system 200 further comprises an electro-pneumatic service braking module 207, which receives the emergency braking pressure 206 and generates at least one service braking pressure 211, . . . , 214, and a service braking control module 208 arranged to control the electro-pneumatic service braking module 207 when an interruption device 216 of the electro-pneumatic service and emergency braking control system 200 allows the connection of a second group of control and feedback signals 209 from the service braking control module 208 to the electro-pneumatic service braking module 207. The electro-pneumatic service braking module 207 may also receive the supply pressure 202.

The service braking control module 208 controls the electro-pneumatic service braking module 207 by means of the second group of control and feedback signals 209 so as to generate the at least one service braking pressure 211, . . . , 214 as a function of the at least one weight information 204 relating to the at least one railway vehicle or railway bogie to be braked and a service braking request 210. Further values may condition the calculation of the service braking pressure 211, . . . , 214 such as for example, but not exclusively, the instantaneous speed value of the vehicle 230, and/or an electrodynamic braking efficiency value 232 provided by the traction systems.

The one or more service braking pressures 211, . . . , 214 have a value less than or equal to a maximum value corresponding to the current assumed value of the emergency braking pressure 206.

The electro-pneumatic service braking module 207 propagates the value of the emergency braking pressure 206 to the at least one service braking pressure 211, . . . , 214 when the interruption device 216 does not allow the connection of the second group of control and feedback signals 209 from the service braking control module 208 to the electro-pneumatic service braking module 207.

The interruption device 216 allows the connection of the second group of control and feedback signals 209 from the service braking control module 208 to the electro-pneumatic service braking module 207 when an emergency braking request signaled by an emergency request signal 215 is absent.

The interruption device 216 does not allow the connection of the second group of control and feedback signals 209 from the service braking control module 208 to the electro-pneumatic service braking module 207 when there is an emergency braking request signaled by the emergency braking request signal 215.

The interruption device 216 may maintain a closed contact configuration in the absence of the emergency braking request from the emergency request signal 215, and maintain an open contact configuration in the presence of the emergency braking request from the emergency braking request signal 215.

Still further, the electro-pneumatic service and emergency braking control system comprises a switching device 221 which allows the connection of the first group of control and feedback signals 222 from the emergency braking control module 203 to the electro-pneumatic emergency braking control module 201 when a monitoring device 223, which monitors the operating status of the emergency braking control module 203, determines the correct operation of the emergency braking control module 203.

The switching device 221 allows the connection of a third group of control and feedback signals 220 from the service braking control module 208 to the electro-pneumatic emergency braking module 201 when the monitoring device 223 determines an incorrect operation of the emergency braking control module 203.

The monitoring device 223 may be obtained by means of a software function, a hardware circuit, or by means of a combination of a software function and a hardware circuit. The monitoring device 223 may also be included directly in the emergency braking control module 203.

Observing FIG. 2, the electro-pneumatic emergency braking module 201 is connected via a group of signals 205 to a common terminal of the switching device 221. The first group of control and feedback signals 222 is connected to a further terminal of the switching device 221, and the third group of control and feedback signals 220 is connected to a still further terminal of the switching device 221.

The switching device 221 has an excitation operative state, in which the switching device 221 positions itself when powered. In this resting operative state, the connection of the first group of control and feedback signals 222 from the emergency braking control module 203 to the electro-pneumatic emergency braking module 201 is allowed.

The switching device 221 has a resting state, wherein said switching device 221 positions itself when not powered, so as to allow the connection of the third group of control and feedback signals 220 from the service braking control module 208 to the electro-pneumatic emergency braking module 201.

In the resting state, said switching device 221 connects the group of signals 205 to the third group of control and feedback signals 220 of the service braking control module 208, connected to the respective terminals of the switching device 221.

In the excitation state, said switching device 221 connects the group of signals 205 to the first group of control and feedback signals 222 of the emergency control module 203, connected to the respective terminals of the switching device 221.

The switching device 221 may be composed of a multi-switching relay, or a multiplicity of semiconductor switches.

Still observing FIG. 2, the monitoring module 223 may generate a control signal 224 for the switching device 221. When said monitoring module 223 detects a correct operation of the emergency braking control module, said monitoring module 223 powers the control signal 224, bringing the switching device 221 to the excitation state, connecting the group of signals 205 to the emergency braking control module 203. When the monitoring module 223 detects a state of incorrect operation of the emergency braking control module 203, said monitoring module 223 disconnects the control signal 224, bringing the switching device 221 to the resting state, connecting the group of signals 205 to the service braking control module 208.

As long as the emergency braking control module 203 is functioning properly, it is able to control the electro-pneumatic emergency braking module 201 to generate the emergency braking pressure 206.

When the monitoring module 223 detects a malfunction of the emergency braking control module 203, the monitoring module 223 passes the control of the electro-pneumatic emergency braking module 203 to the service braking control module 208. In this way, the service braking control module 208 may control the electro-pneumatic emergency braking module 201 to continue to correctly generate the emergency braking pressure 206.

A first advantage offered by this solution is that, in the presence of a failure of the emergency braking control module 203, the electro-pneumatic service braking module 207 continues to receive a correct emergency pressure value 206, which allows it to correctly generate the service braking pressures 211, . . . , 214 up to their maximum requested value.

A second advantage offered by the solution proposed by the present invention is represented in that, in the presence of a failure of the emergency braking control module 203, upon the arrival of an emergency braking request by the signal 215, the emergency braking pressure 206 will still be available and replicated on the service braking pressures 211, . . . , 214 of the electro-pneumatic service braking module 207, with a safety level at least equal to the safety level of the service braking control module 208. In this case, it will be the responsibility of the railway operator to decide whether the safety level lower than that recommended by the regulations is acceptable to complete the daily service cycle of the vehicle before resorting to the replacement of the electropneumatic system 200.

Various aspects and embodiments of an electro-pneumatic service and emergency braking control system have been described, for at least one railway vehicle or one railway bogie, according to the invention. It is understood that each embodiment may be combined with any other embodiment. Furthermore, the invention is not limited to the described embodiments, but may be varied within the scope defined by the appended claims.

The invention claimed is:

1. A braking control system, for a railway vehicle or a railway bogie, comprising:
    an emergency braking control module configured to generate an emergency braking pressure;
    an electro-pneumatic service braking control module configured to receive said emergency braking pressure to generate at least one service braking pressure;
    a service braking control module configured to control the electro-pneumatic service braking module;
    to generate the at least one service braking pressure with a second group of control signals; and
    a switching device configured to allow the connection of the first group of control signals from the emergency braking control module to the electro-pneumatic emergency braking module responsive to when a monitoring device arranged to monitor the operating state of the emergency braking control module determines a correct operation of said emergency braking control module and to allow the connection of a third group of control signals from the service braking control module to the electro-pneumatic emergency braking module responsive to when when the monitoring device determines an incorrect operation of said emergency braking control module.

2. The system according to claim 1, wherein
    the switching device comprises
    an excitation operative state, wherein the switching device positions itself when powered, so as to allow the connection of the first control signal from the service braking control module to the electro-pneumatic emergency braking module, and
    a resting operative state, wherein the switching device positions itself when not powered, so as to allow the connection of the third control signal from the service braking control module to the electro-pneumatic service braking module.

3. The system according to claim 1, further comprising an interruption device arranged to maintain a closed contact configuration when an emergency braking request is absent via the emergency request signal, and to maintain an open contact configuration in the presence of the emergency braking request by the emergency braking request signal.

4. The system according to claim 1, wherein the electro-pneumatic service braking module and the emergency braking control module also receives the supply pressure.

5. The system according to claim 1, wherein the monitoring device is made by means of a software function, a hardware circuit, or by means of a combination of a software function and a hardware circuit.

6. The system according to claim 1, wherein the monitoring device is included in the emergency braking control module.

* * * * *